March 18, 1952 D. G. GRISWOLD 2,590,007
LIQUID PROPORTIONING AND SPRAYING APPARATUS
Filed July 22, 1946 3 Sheets-Sheet 1

Inventor
Donald G. Griswold
By Bacon + Thomas
Attorneys

March 18, 1952  D. G. GRISWOLD  2,590,007
LIQUID PROPORTIONING AND SPRAYING APPARATUS
Filed July 22, 1946  3 Sheets-Sheet 2

Inventor
Donald G. Griswold
Bacon + Thomas
Attorneys

March 18, 1952 D. G. GRISWOLD 2,590,007
LIQUID PROPORTIONING AND SPRAYING APPARATUS
Filed July 22, 1946 3 Sheets-Sheet 3

Inventor
Donald G. Griswold
By Bacon + Thomas
Attorneys

Patented Mar. 18, 1952

2,590,007

UNITED STATES PATENT OFFICE 2,590,007

LIQUID PROPORTIONING AND SPRAYING APPARATUS

Donald G. Griswold, San Marino, Calif.

Application July 22, 1946, Serial No. 685,396

19 Claims. (Cl. 299—84)

The present invention relates to liquid proportioners, and more particularly to a liquid proportioner of general utility that will continuously deliver a mixture of at least two liquids in a desired constant volumetric ratio.

The invention further relates to a liquid proportioner which is adjustable to vary the ratio of the volumes of the liquids in the mixture delivered thereby.

The invention further relates to a combined proportioning and spraying apparatus especially suitable for accurately mixing prescribed volumes of at least two liquids for various spray applications. As one illustrative use of the invention, precise relative volumes of raw water and liquid fertilizer, or any chemical solution, may be concurrently mixed and sprayed for agricultural, horticultural, or insecticidal purposes.

The invention still further relates to a novel, positive displacement pump adapted to be operatively associated with one cylinder of a multicylinder hydraulic motor operated by water under pressure, and to be actuated on its working stroke by a piston of said motor for pumping a given volume of treating liquid into the stream of water exhausted from said motor and mixed therewith. This feature eliminates the necessity of providing large storage tanks for mixing measured volumes of the treating liquid and water prior to spraying.

Various chemical compounds in the form of fertilizers, plant foods, insecticides, etc., have made their appearance on the market, but their general and widespread use has been retarded largely because of inadequate means for readily and conveniently mixing the same with water in uniform, fixed proportions for effective spray application to lawns, plants, trees, shrubs, etc. As is well known, if certain treating mixtures are too strong, they will injure or "burn" the vegetation, and if they are too weak, their effectiveness is lost. The present invention overcomes the existing problems by providing means whereby a treating liquid of any given concentration can be readily mixed with water in the exact desired proportions for optimum effectiveness, and sprayed upon any given objective. The necessity for electrically or gasoline driven pumps is eliminated inasmuch as the line pressure of the water which is to be mixed with the treating liquid is utilized as the means for operating the hydraulic motor, which in turn actuates a treating liquid pump in timed relation therewith to add a predetermined volume of treating liquid to a predetermined volume of the water exhausted from said motor, the pressure of the mixture of treating liquid and water-exhaust being sufficient to form a good spray at the spray nozzle. In this manner, water under main pressure can be utilized for the dual purpose of effecting the admixture therewith of the treating liquid in a constant volumetric ratio, and as a vehicle for applying the treating liquid to an objective.

Accordingly, the principal object of the invention is to provide a liquid proportioning apparatus which will continuously deliver a mixture of at least two liquids in a predetermined constant volumetric ratio.

Another object of the invention is to provide liquid proportioning apparatus which can be adjusted to vary the relative volumes of the liquids handled thereby.

Another object of the invention is to provide liquid proportioning apparatus in which a predetermined volume of one of the liquids functions as a motivating fluid for producing admixture therewith of a predetermined volume of another liquid.

Still another object of the invention is to provide a combined proportioning and spraying apparatus which will continuously deliver a spray under pressure containing a mixture of two liquids in constant prescribed volumetric proportions.

A further object of the invention is to provide constant-proportion spraying apparatus which eliminates the necessity of pre-mixing measured volumes of a plurality of liquids in a tank prior to use.

A further object of the invention is to provide a portable spraying outfit in which water under main pressure can be utilized as an operating medium for a positive displacement type of hydraulic motor and in which the hydraulic motor actuates a pump for introducing a predetermined volume of treating liquid into the exhaust stream from the hydraulic motor.

A further object of the invention is to provide a combined proportioning and spraying apparatus in which the treating liquid can be selectively delivered to either a high pressure spray nozzle for direct application, or mixed with a predetermined volume of an exhaust stream from a hydraulic motor and thus applied in diluted form.

A still further object of the invention is to provide a liquid pump of variable volumetric displacement.

Still another object of the invention is to provide a liquid proportioning apparatus including a hydraulic motor operated by one of the liquids to be proportioned, and a pump for another of the liquids to be proportioned, with the pump and hydraulic motor arranged so that the pump is automatically primed by the exhaust stream from the hydraulic motor.

Other objects and features of the invention will be apparent from the following description taken in conjunction with the accompanying drawings, in which.

Figure 1:
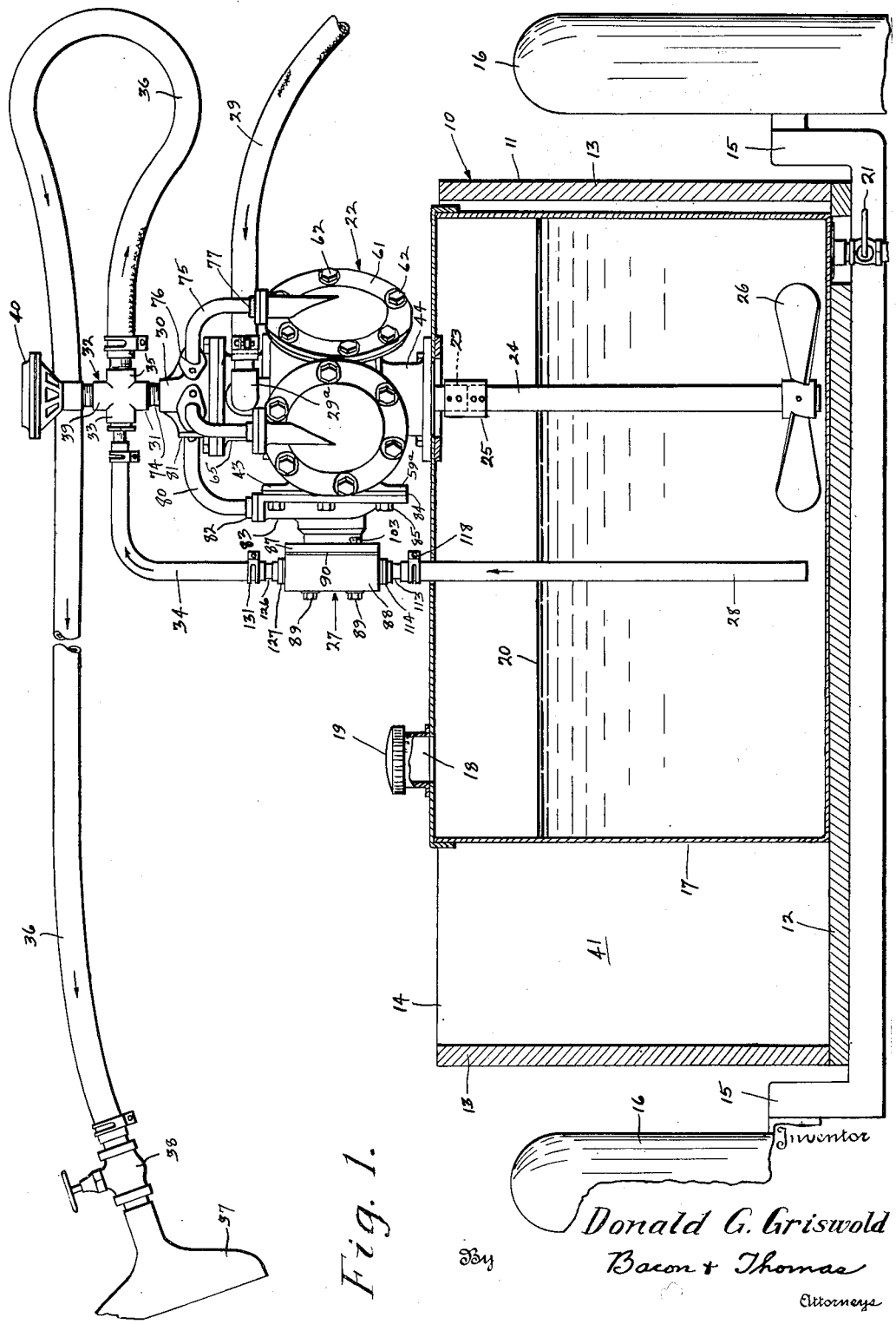
Fig. 1 is a diagrammatic view, partly in section, illustrating a combined liquid proportioning and spraying apparatus including a hydraulic motor and pump embodying the principles of the present invention.
Figures 2, 5:
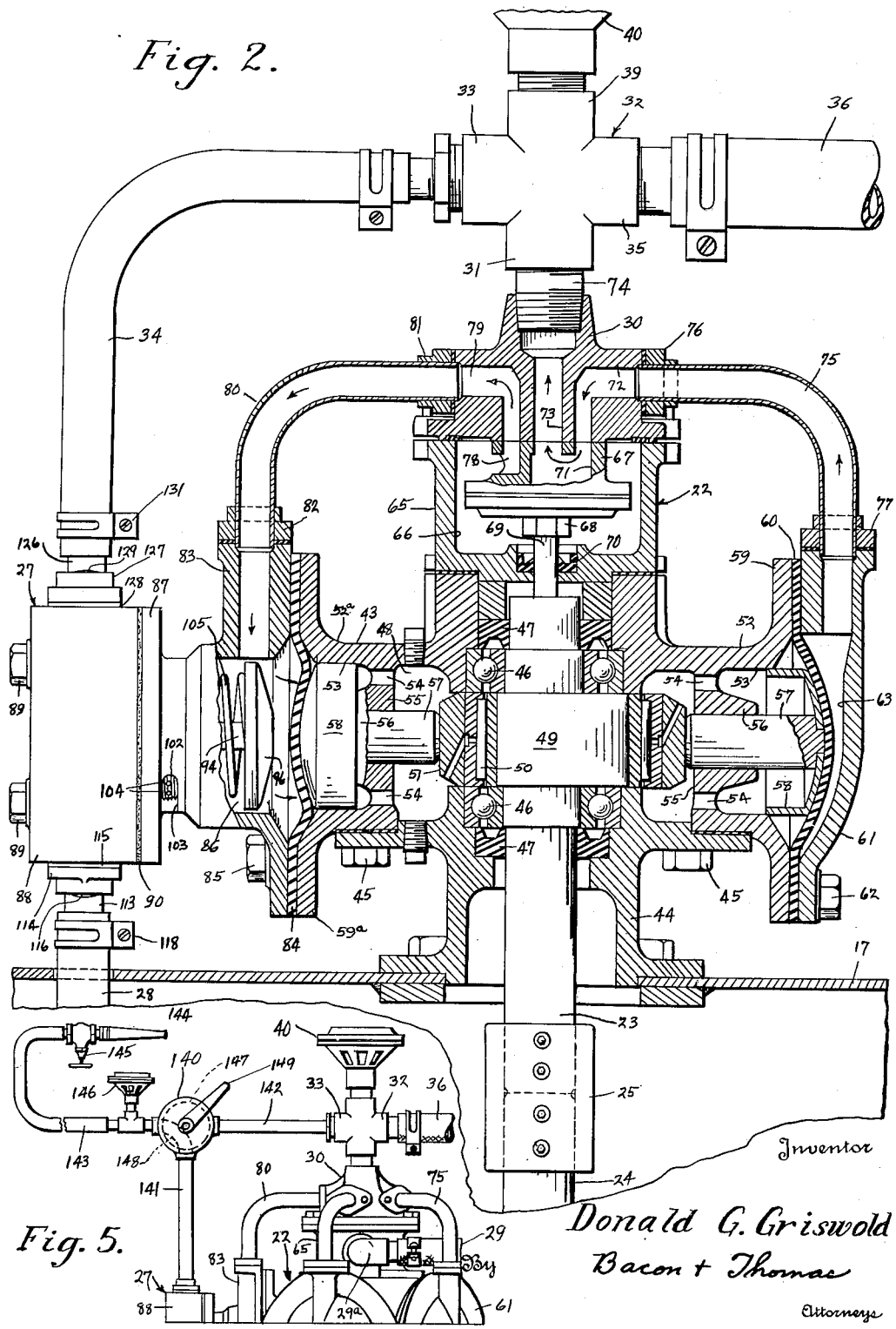
Fig. 2 is an enlarged vertical sectional view taken through the hydraulic motor and showing a portion of the pump associated therewith in cross-section.
Figure 4:
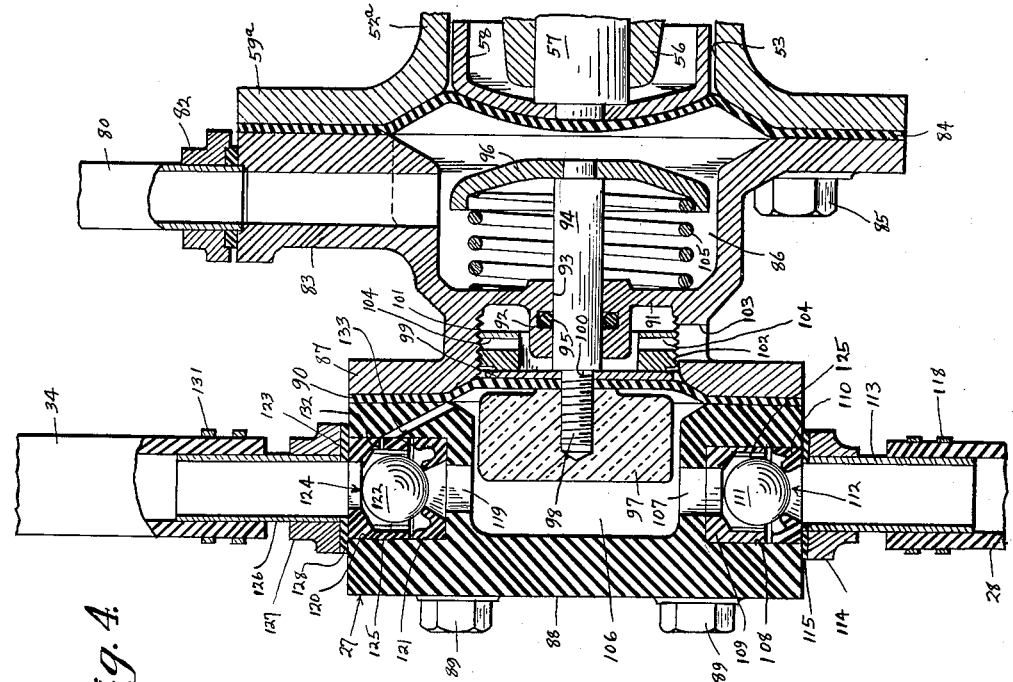
Figure 3:
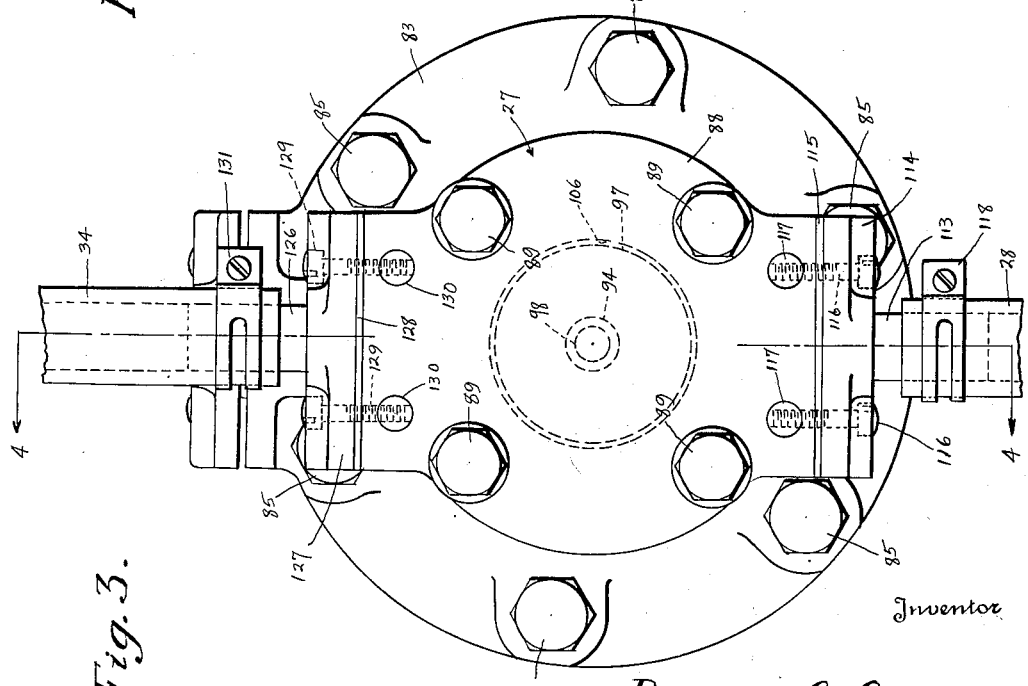
Fig. 3 is a further enlarged left end elevational view of the pump shown in Figs. 1 and 2.

Fig. 4 is a vertical sectional view through the pump taken along the section-line 4—4 of Fig. 3; and Fig. 5 is a view diagrammatically illustrating the manner in which the apparatus of Fig. 1 may be modified to include a three-way valve for optionally delivering the treating liquid directly to a high pressure spray nozzle for direct application, or for admixture with the exhaust stream from the hydraulic motor for application in diluted form.

Referring now to Fig. 1 of the drawings, the numeral 10 generally identifies a conventional trailer including a body 11 having a bottom wall 12, opposed side walls 13, and opposed end walls 14 (only one of which is shown). The body 11 is mounted upon an axle 15 having wheels 16 associated therewith for enabling the trailer 10 to be hauled from one job to another.

A tank 17 rests upon the bottom wall 12 of the trailer and may be secured thereto in any desirable manner. The tank 17 is provided with a filler opening 18 having a cap 19 and through which opening the treating liquid 20 can be introduced into said tank. The treating liquid 20 can be liquid fertilizer, an insecticide, or any other liquid medium either devoid of or containing a material in solution or suspension. A drain valve 21 is connected with the bottom of the tank 17 to enable the liquid 20 to be drained from said tank, when desired.

A prime mover in the form of a hydraulic motor 22, which will be described in detail later, is conveniently mounted upon the top of the tank 17 and includes a driven shaft 23 connected with the upper end of a shaft 24 by a coupling 25. An agitator or bladed member 26 is secured to the lower end of the shaft 24 and is adapted to stir or agitate the liquid 20, in the event that said liquid includes solids or suspended matter which would otherwise settle out on the bottom of the tank 17.

A treating liquid pump 27, which will also be described in detail later, is mounted upon one cylinder of the hydraulic motor 22 and includes an intake hose 28 which extends into the tank 17 to a point close to the bottom of said tank. Water under main pressure is supplied to the motor 22 through a hose 29 and exhausts from said motor through a fluid distribution plate 30. The plate 30 is connected with the lower branch 31 of a cross-fitting 32. One of the side branches 33 of the cross-fitting 32 is connected with one end of a hose 34, the opposite end of said hose being connected with the discharge side of the pump 27. The other side branch 35 of the cross-fitting 32 is connected to one end of a hose 36 and the opposite end of said hose is connected with a conventional nozzle 37 which preferably forms a fan-shaped spray. A shut-off valve 38 is connected in the hose 36 adjacent the nozzle 37. The upper branch 39 of the cross-fitting 32 is connected with a very sensitive conventional or suitable vacuum breaker or anti-siphon valve 40 for preventing siphoning of the treating liquid 20 from the tank 17 through the hose 36 when the apparatus is not in use, and particularly in the event that the operator leaves the nozzle 37 on the ground and neglects to close the shut-off valve 38. A space 41 in the trailer 10 between one of the side walls 13 and the adjacent side wall of the tank 17 is adapted to provide storage space for cans of treating liquid and extra lengths of hose (not shown), etc., and the hoses 29 and 36 when not in use.

The details of construction of the hydraulic motor 22 are best shown in Fig. 2 from which it will be noted that said motor includes housing sections 43 and 44 secured together by bolts 45. Each of the housing sections 43 and 44 contains a ball bearing 46 serving as an antifriction mounting for the driven shaft 23. Packing rings 47 serve as seals around the shaft 23 to prevent the escape of lubricant from a lubricant chamber 48 formed in the housing section 43 and closed by the housing section 44.

The motor shaft 23 is provided with an enlarged, eccentric portion 49 located in the chamber 48 between the ball bearings 46. A roller bearing 50 surrounds the eccentric portion 49 and a wear ring 51 surrounds the roller bearing 50. The housing section 43 includes, say, five radially extending cylinders. Two of these cylinders are shown in Fig. 2 and identified by the numerals 52 and 52ᵃ, respectively. Each of the cylinders 52 and 52ᵃ includes a bore 53 communicating at its inner end with the chamber 48 through openings 54 formed in a transverse wall 55 at the inner end of said bore. Each of the walls 55 carries a boss 56 which slidably receives a rod 57 secured to a piston 58. The inner ends of the rods 57 engage the outer periphery of the wear ring 51.

The cylinder 52 terminates in a circular flange 59, and a flexible diaphragm 60 overlies the flange and the head of the piston 58. A cover 61 cooperates with the diaphragm 60 to form a closure for the cylinder 52. Bolts 62 secure the cover 61 and diaphragm 60 to the flange 59. The cover 61 is recessed to provide a chamber 63 for operating fluid disposed on the outer side of the diaphragm 60.

A generally cup-shaped valve housing 65 is suitably mounted upon the upper end of the housing section 43 and contains a chamber 66 into which water under pressure from the hose 29 is introduced, the hose 29 being connected to the housing 65 by a fitting 29ᵃ (Fig. 1). The fluid distribution plate 30, previously mentioned, is suitably secured to the valve housing 65 and forms a closure for the upper end thereof. The chamber 66 contains a rotary valve 67, which is drivingly interconnected at 68 with an extension 69 of the motor shaft 23. A packing 70 carried by the valve housing 65 forms a seal around the extension 69. The rotary valve 67 includes an exhaust port 71 which, in one operative position thereof, is adapted to establish communication between a port 72 and an exhaust passage or outlet 73 in the fluid distribution plate 30. A pipe nipple 74 connects the passage 73 with the lower branch 31 of the cross-fitting 32. The port 72 is continuously connected with the chamber 63 in the cover 61 by a tube 75 secured at one end thereof to the fluid distribution plate 30 by a fitting 76 and secured at its opposite end to the cover 61 by a similar fitting 77. Hence, when the rotary valve 67 is in the position shown, operating fluid is exhausted from the chamber 63 through the tube 75, port 72 in the distribution plate 30, exhaust port 71 in the rotary valve 67, and the exhaust passage 73 in said distribution plate, and thence into the cross-fitting 32.

The rotary valve 67 is also provided with a pressure port 78, which always communicates with the chamber 66, and when said valve is in the position shown in Fig. 2 registers with a port 79 in the distribution plate 30. A tube 80 has one end thereof in communication with the port 79 and is connected at said end to the distribution plate 30 by a fitting 81, and the opposite end of said tube is connected by a fitting 82 with a modified cover 83 forming a closure for the cylinder 52ᵃ. A flexible diaphragm 84 is arranged between the cover 83 and a flange 59ᵃ to form a closure for the cylinder 52ᵃ. Bolts 85 secure the cover 83 and diaphragm 84 to the flange 59ᵃ. Hence, at about the time that the rotary valve 67 is exhausting operating fluid (water) from the chamber 63, as above described, operating fluid (water) under pressure is admitted from chamber 66 through the pressure port 78, and port 79 and tube 80 into a pressure chamber 86 formed within the cover 83. This liquid will act upon the diaphragm 84 and urge the piston 58 in the cylinder 52ᵃ toward the right, as viewed in Fig. 2, to impart an impulse through the rod 57 to the wear ring 51. Such impulses from the rods 57 in the several cylinders will effect positive and continuous rotation of the motor shaft 23, the shaft 23 in turn effecting rotation of the rotary valve 67 to admit operating liquid into and to exhaust operating liquid from the several pressure chambers 63 and 86, in predetermined succession, all in a manner well understood in the art. The volume of water introduced into each chamber 63 to effect inward movement of its associated piston is constant, and this is also true of the water introduced into chamber 86, inasmuch as these chambers are all devoid of air pockets and must be completely filled to move the pistons 58 through the full length of their work stroke. Hence, the exhaust stream from the motor contains a predetermined volume of water for each revolution of the shaft 23.

The cover 83 serves as a base for the treating-liquid pump 27, previously referred to. The cover 83 carries a circular flange 87, and a hard rubber pump body 88 is secured to said flange by a plurality of bolts 89, a flexible diaphragm 90 being disposed between said flange and body. The cover 83 has a transverse wall 91 forming one end of the chamber 86 and is provided with a central boss 92. The boss 92 has a bore 93 which slidably receives a piston rod 94. A packing ring 95 forms a seal between the bore 93 and the piston rod 94 and prevents the escape of operating fluid from the pressure chamber 86. A dished abutment plate 96 is mounted upon the inner end of the rod 94 and a "Lucite" piston or liquid displacement member 97 is mounted upon a reduced threaded portion 98 of the rod 94. The reduced rod portion 98 extends through the diaphragm 90, and a diaphragm supporting plate 99 is mounted on said reduced portion between a shoulder 100 and the adjacent side of said diaphragm.

The cover 83 is provided with an internal thread 101 and a ring 102 is disposed between the diaphragm supporting plate 99 and the transverse wall 91, and is threaded at its outer periphery for engagement with the threads 101. The cover 83 is further provided with at least one elongated slot 103 in the zone of the threads 101, and the ring 102 is provided with radially extending holes 104 spaced apart a distance less than the circumferential length of the slot 103, so that said ring can be axially adjusted within the cover 83 by the insertion of a pin (not shown) through the slot 103 into the holes 104 for effecting rotation of said ring. A compression spring 105 is disposed between the transverse wall 91 and the abutment plate 96 and is arranged to normally urge the diaphragm supporting plate 99 into engagement with one side of the ring 102, and in this manner limit the return or suction stroke of the diaphragm 90 and the piston 97. Thus, it will be apparent that the ring 102 can be adjusted to vary the stroke or displacement of the piston 97, and therefore, the volume of liquid pumped by said piston, without requiring disassembly or removal of any parts of the pump 27.

The pump body 88 (Fig. 4) contains a pumping chamber 106 in which the piston 97 is reciprocable. An inlet passage 107 communicates with the lower portion of the chamber 106 and is enlarged as indicated at 108 for the reception of an inverted rubber cage 109 and an annular rubber member 110 which serves as a seat for a spherical glass ball 111 cooperating with the seat 110 to provide an inlet check valve generally identified by the numeral 112. A tube 113 of corrosion-resistant metal is soldered to a brass fitting 114, and a rubber gasket 115 is disposed between the fitting 114 and the pump body 88. Screws 116 (Fig. 3) are threaded into metal inserts 117 molded into the hard rubber pump body 88 and secure said fitting to said pump body. The hose 28, which extends into the treating liquid 20, is secured at its upper end to the tube 113 by a clamp 118.

An outlet passage 119 in the pump body 88 is vertically aligned with the inlet passage 107 and communicates with the upper portion of the pumping chamber 106. The passage 119 is enlarged at 120 for the reception of an annular rubber member 121 serving as a seat for a spherical glass ball 122. An inverted cup-shaped rubber cage 123 is disposed in the enlarged portion 120 of the passage 121 and receives the ball 122, which cooperates with the seat 121 to function as an outlet check valve generally designated 124. The flow of treating liquid 20 through the cages 109 and 123 is facilitated when the balls 111 and 122, respectively, are unseated, by the formation in said cages of a plurality of longitudinally extending grooves 125. One end of a corrosion-resistant metal tube 126 is soldered to a brass fitting 127, and a rubber gasket 128 is disposed between the fitting 127 and the pump body 88. Screws 129 (Fig 3) are threaded into metal inserts 130 molded into the pump body 88 and secure said fitting to said pump body. One end of the hose 34 is secured to the tube 126 by a clamp 131, so that constant communication is established between the cross-fitting 32 and the outlet or discharge side of the pump 27.

One of the important features of the solution pump 27 (Fig. 4) is that it is automatically primed upon operation of the hydraulic motor 22, by by-passing liquid around the outlet check valve 124. The priming of the pump 27 is effected through a small passageway 132 extending transversely through the cage 123 and constantly communicating with one end of a passageway 133 opening into the pumping chamber 106. Assuming that the pump 27 requires priming, as the motor-operating liquid is discharged into the cross-fitting 32 from the hydraulic motor 22, a portion thereof will flow by gravity through the hose 34 into the cage 125 and, thence, through the passages 132 and 133 into the pump chamber 106 to facilitate the creation of the necessary suction to raise the liquid from the tank 17 into the pump chamber 106 through the hose 28 upon the return stroke of the diaphragm 90 and piston 97.

The pump 27 is given one work-stroke for each revolution of the motor shaft 23, i. e., the pump work-stroke corresponds to the work-stroke of the piston 58 in the cylinder 52ª. However, the stroke of the piston 58 is longer than that of the piston 97 because of the lost motion resulting from the initial spacing of the abutment plate 96 from the diaphragm 84. Thus, the piston 97 is not moved toward the left, as viewed in Fig. 4, until the abutment plate 96 is engaged by the diaphragm 84, whereupon it will positively displace a predetermined volume of liquid 20 from the pumping chamber 106, resulting in a forced opening of the outlet check valve 124 and the discharge of the displaced liquid into the hose 34. As the piston 97 and diaphragm 90 are returned toward the right by the spring 105, the ball 122 will instantly seat and the suction created in the chamber 106 will lift the ball 111 from its seat, thus opening the inlet check valve 112, and draw enough treating liquid through the hose 28 into the pumping chamber 106 to completely fill the same. The passage 132 is too small to interfere with the creation of a strong suction in the chamber 106 during the return stroke of the piston 97. The next work-stroke of the piston 97 will displace a predetermined volume of liquid 20 as the pumping cycle is repeated.

The treating liquid 20 thus pumped into the hose 34 is forced into the cross-fitting 32 into which the water-exhaust from all of the cylinders 52—52ª of the motor 22 is also forced, and the water and liquid 20 are caused to mix to some extent in the cross-fitting 32 and further and complete mixing thereof is effected as the liquids are forced through the hose 36. Tests with transparent hose and colored liquids have shown that complete and thorough intermixture of the two liquids is attained in the hose 36 within a few feet of the cross-fitting 32, so that the two liquids are properly intermixed in precise proportions before they reach the spray nozzle 37.

In spraying a certain liquid fertilizer, for example, about twenty-five parts of water are mixed with one part of said liquid fertilizer. One operative form of hydraulic motor 22 has five cylinders and a piston stroke of ½". The pump 27 is so designed that a stroke of about ¼" of the piston rod 94 of the pump 27 will give a twenty-five to one ratio of water to treating liquid.

In the normal use of the apparatus, and with the hydraulic motor 22 in operation, the automatic vacuum breaker valve 40 is held tightly closed by the pressure of the liquids in the cross-fitting 32. However, in the event that the operator should leave the nozzle end of the hose 36 in a position lower than the level of the treating liquid 20 in the tank 17, such treating liquid would normally siphon out through the hose 36 resulting in a loss of the treating liquid and damage to the vegetation being treated as a result of the strong charge of treating liquid having been either introduced into the hose 36 or else having drained from said hose onto the lawn, etc.; but such loss and damage are positively prevented by the vacuum breaker 40, which instantly opens the cross-fitting 32 to the atmosphere in the event that the slightest suction condition is created in the hose 36. The opening of the cross-fitting 32 to the atmosphere, of course, precludes the siphoning of any liquid 20 out of the tank 17 when the motor 22 is inactive.

The hydraulic motor 22 can be provided with more than five cylinders, and if more than two liquids are to be mixed in predetermined proportions, a second cylinder of the motor 22 may be modified to operate a pump (not shown), but similar to the pump 27, to pump a third liquid so that it is discharged and mixes with the exhaust-water and the treating liquid from the pump 27 prior to delivery to a spray nozzle or other destination.

Fig. 5 diagrammatically illustrates one way in which the apparatus shown in Fig. 1 may be modified so that it can be optionally utilized to deliver a treating liquid of suitable concentration directly to a high pressure spray nozzle for direct application, or for admixture with the exhaust liquid from the hydraulic motor and applied in diluted form. Thus, the discharge side of the pump 27 is shown connected with the inlet of a conventional three-way valve 140 by a conduit 141. One of the outlets of the three-way valve 140 is connected by a conduit 142 with the side branch 33 of the cross-fitting 32. The other outlet of the three-way valve 140 is connected with a hose 143 having a high pressure nozzle 144 and a shut-off valve 145 connected therewith. A sensitive, automatic vacuum breaker valve 146, similar to the valve 40, is preferably connected between the three-way valve 140 and the hose 143, in order to prevent any possible siphoning of the treating liquid out of the tank 17 through the hose 143.

The three-way valve 140 includes a disc 147 provided with an arcuate port 148 which, when disposed in the position shown in Fig. 5, establishes communication between the conduit 141 at the discharge side of the pump 27 and the hose 143, so that the treating liquid is not mixed with the water exhausted from the motor 22 in the cross-fitting 32, but on the other hand, the treating liquid is delivered under pressure for direct application by the nozzle 144. A handle 149 is connected with the disc 147, and it will be apparent that when said handle is turned counterclockwise through an angle of 90°, the arcuate port 148 will then establish communication between the conduits 141 and 142. This will prime the pump 27 if that is all that is desired, or the port 148 may be allowed to remain in such position and the treating liquid will be pumped into the cross-fitting 32 and mix with the water-exhaust for spray application through the hose 36.

When the disc 147 is in the position shown in Fig. 5, the water used to operate the motor 22 to effect driving of the pump 27 will exhaust as heretofore into the cross-fitting 32, but will discharge alone through the hose 36 as waste. Thus, the disc 147 of the three-way valve 140 is adapted to be selectively positioned to effect either delivery of the treating liquid alone for direct application, or a mixing of the treating liquid with the water discharged from the motor 22 to form a spray containing the treating liquid in a predetermined ratio to the water employed to drive the motor 22.

It will be apparent that, in lieu of employing the three-way valve 140, the delivery of the pumped treating liquid to a high pressure nozzle can be effected with the apparatus shown in Figs. 1 to 4, by simply disconnecting the hose 34 from the pump 27 and hydraulic motor 22, plugging the branch 33 of the cross-fitting 32 and attaching a nozzle and suitable length of hose (not shown) to the pump discharge tube 126. However, such arrangement has the disadvantage of preventing exhaust-water from the motor 22 from reaching the pump 27 to prime said pump. This is not serious because the pump 27 can be primed by introducing liquid into the tube 126 prior to connecting the high pressure nozzle and hose thereto.

It will be understood that the liquid proportioning apparatus comprising the motor 22 and pump 27 is generally useful and not limited to use with spraying equipment, although such specific use has proved highly satisfactory.

It will also be understood that various changes may be made in the details of construction and in the arrangement of the parts of the proportioning and spraying apparatus disclosed herein, without departing from the spirit of the invention or the scope of the annexed claims.

I claim:

1. A liquid proportioning apparatus, comprising: a multi-cylinder, positive displacement, hydraulic rotary motor operable by an operating liquid under pressure, each of said cylinders having a piston therein, said hydraulic motor having a common exhaust outlet for used operating liquid from the several cylinders of said motor; a positive displacement pump for pumping a prescribed volume of a treating liquid, said pump including an inlet adapted to be connected with a supply of said treating liquid, and an outlet, said pump including a pumping element arranged to be actuated by the piston in one cylinder of said hydraulic motor in timed relation therewith, said pumping element normally being spaced from said piston and free from connection thereto, but disposed so that it is actuated during only a part of the stroke of said piston; conduit means interconnecting the outlet of said pump and said exhaust outlet of said hydraulic motor to effect mixing of the pumped treating liquid and the exhaust liquid; and a discharge conduit for the mixed liquids connected with said last-mentioned conduit means.

2. A liquid proportioning apparatus, comprising: a multi-cylinder, positive displacement, hydraulic motor operable by liquid under pressure, said hydraulic motor having an outlet for exhaust liquid; a positive displacement pump for pumping a treating liquid, said pump having an inlet adapted to be connected with a supply of treating liquid, and an outlet, said pump being arranged to be actuated by said hydraulic motor in predetermined timed relation therewith; and means establishing communication between said pump outlet and said hydraulic motor outlet for automatically priming said pump with exhaust liquid from said hydraulic motor, immediately upon starting of said hydraulic motor.

3. A liquid proportioning apparatus, comprising: a hydraulic motor including a plurality of cylinders, each containing a piston and requiring a predetermined volume of liquid to effect movement of the piston through its working stroke, said hydraulic motor having an exhaust outlet for operating liquid; a positive displacement pump for pumping a prescribed volume of a treating liquid, said pump having an inlet adapted to be connected with a supply of said treating liquid, and an outlet, said pump being mounted upon one of said cylinders of said hydraulic motor and having a pumping element arranged to be actuated by the piston in the cylinder associated therewith only during movement of said piston in a direction toward said pump; and conduit means interconnecting the outlet of said pump and said exhaust outlet of said hydraulic motor so that the exhausted operating liquid and pumped treating liquid are mixed together in predetermined proportions.

4. A liquid proportioning and spraying apparatus, comprising: a hydraulic motor including a plurality of cylinders, each containing a piston and requiring a predetermined volume of liquid to effect movement of the piston through its working stroke, said hydraulic motor having a common exhaust outlet for operating liquid from all of said cylinders; a positive displacement pump for pumping a prescribed volume of a treating liquid, said pump having an inlet adapted to be connected with a supply of said treating liquid, and an outlet, said pump being mounted upon and forming at least in part a closure for one end of one of said cylinders of said hydraulic motor and arranged to be actuated by movement of the piston in the cylinder associated therewith; conduit means interconnecting the outlet of said pump and said exhaust outlet of said hydraulic motor so that the exhausted operating liquid and pumped treating liquid are mixed together in predetermined proportions; and a spray nozzle connected with said conduit means.

5. A liquid proportioning and spraying apparatus as defined in claim 4, including an anti-syphon valve connected with the conduit means and arranged to prevent syphoning of liquid from the treating liquid tank when the hydraulic motor is inactive.

6. A liquid proportioning apparatus, comprising: a hydraulic motor including a plurality of cylinders, each containing a piston and requiring a predetermined volume of liquid to effect movement of the piston through its working stroke, said hydraulic motor having a common exhaust outlet for operating liquid from all of said cylinders; a positive displacement pump for pumping a prescribed volume of a treating liquid, said pump having an inlet adapted to be connected with a supply of said treating liquid, and an outlet, said pump being mounted upon one of said cylinders of said hydraulic motor and arranged to be actuated by movement of the piston in the cylinder associated therewith and at least in part forming a closure for one end of said one cylinder; means for varying the stroke of said pump and, hence, the volume of treating liquid pumped by said pump; and conduit means interconnecting the outlet of said pump and said exhaust outlet of said hydraulic motor so that the exhausted operating liquid and pumped treating liquid are mixed together in predetermined proportions.

7. A liquid proportioning and spraying apparatus, comprising: a multi-cylinder, positive displacement, rotary type of hydraulic motor operable by water under pressure, said hydraulic motor having an outlet for exhaust water; a positive displacement pump for pumping a treating liquid, said pump having an inlet and an outlet and being mounted upon one end of one of said cylinders of said hydraulic motor and arranged to be actuated thereby, said pump forming at least in part a closure for said end of said one cylinder; a tank adapted to contain a treating liquid; a supply conduit for conducting liquid from said tank to the inlet side of said pump; conduit means interconnecting the outlet of said pump and the outlet of said hydraulic motor so that the exhaust water and said pumped treating liquid are mixed together therein; and a spray nozzle connected with said conduit means.

8. A liquid proportioning and spraying apparatus, comprising: a multi-cylinder, positive displacement, rotary type of hydraulic motor operable by water under pressure, said hydraulic motor having an outlet for exhaust water; a positive displacement pump for pumping a treating liquid, said pump having an inlet and an outlet and being mounted upon one end of one of said cylinders of said hydraulic motor and arranged to be actuated thereby; a tank adapted to contain a treating liquid, said motor including a driven shaft; an agitator in said tank driven by said shaft for agitating said treating liquid; a supply conduit for conducting liquid from said tank to the inlet side of said pump; conduit means interconnecting the outlet of said pump and the outlet of said hydraulic motor so that the exhaust water and said pumped treating liquid are mixed together therein; and a spray nozzle connected with said conduit means.

9. A liquid proportioning apparatus, comprising: a multi-cylinder, positive displacement, hydraulic motor operable by water under pressure, said motor having a common exhaust outlet for the water from all of said cylinders; a positive displacement pump for pumping a treating liquid, said pump including an outlet, and an inlet adapted to be connected with a supply of said treating liquid, said pump being mounted upon one end of one of said cylinders of said hydraulic motor and arranged to be actuated thereby, said pump including a body having a pumping chamber, inlet and outlet check valves, and priming passage means interconnecting said pump outlet and said pumping chamber to establish a by-pass around said outlet check valve; a multi-way fitting having one branch thereof connected with the exhaust outlet of said motor; and means connecting another branch of said fitting with said outlet of said pump so that exhaust water can flow through said conduit to said pump to effect automatic priming thereof upon starting of said motor.

10. A liquid proportioning and spraying apparatus, comprising: a multi-cylinder, positive displacement, hydraulic motor operable by water under pressure, said motor having a common exhaust outlet for the water from all of said cylinders; a positive displacement pump for pumping a treating liquid, said pump including an outlet, and an inlet adapted to be connected with a supply of said treating liquid, said pump being mounted upon one end of one of said cylinders of said hydraulic motor and arranged to be actuated thereby, said pump including a body having a pumping chamber, inlet and outlet check valves, and passage means interconnecting said pump outlet and said pumping chamber to establish a by-pass around said outlet check valve; a multi-way fitting having one branch thereof connected with the exhaust outlet of said motor; means connecting another branch of said fitting with said outlet of said pump so that exhaust water can flow through said conduit to said pump to effect automatic priming thereof upon starting of said motor; a hose connected with another branch of said fitting; and a spray nozzle attached to said hose.

11. A liquid proportioning and spraying apparatus, comprising: a multi-cylinder, positive displacement, hydraulic motor operable by water under pressure, said motor having an exhaust outlet for used water; a positive displacement pump for pumping a treating liquid, said pump having an inlet and an outlet and being mounted upon one end of one of said cylinders of said hydraulic motor and arranged to be actuated thereby; a tank adapted to contain a treating liquid; a conduit for conducting treating liquid from said tank to said inlet of said pump; a cross-fitting having one branch thereof connected with said outlet of said motor and another branch thereof connected with the outlet side of said pump, so that the exhaust water and the treating liquid commingle in said cross-fitting; a hose connected with another branch of said cross-fitting; a spray nozzle attached to said hose; and an anti-syphon valve connected with the remaining branch of said cross-fitting for preventing syphoning of said treating liquid from said tank through said hose when said hydraulic motor is inactive.

12. A liquid proportioning and spraying apparatus, comprising: a multi-cylinder, positive displacement, hydraulic motor operable by water under pressure, said motor having an exhaust outlet for used water; a positive displacement pump for pumping a treating liquid, said pump having an inlet and an outlet and being mounted upon one end of one of said cylinders of said hydraulic motor and arranged to be actuated thereby, said pump also including means for priming the same; a tank adapted to contain a treating liquid; a conduit for conducting treating liquid from said tank to the inlet side of said pump; a cross-fitting having one branch thereof connected with said outlet of said motor and another branch thereof connected with said outlet of said pump, so that the exhaust water and the treating liquid commingle in said cross-fitting, said latter connection providing means for making the exhaust water available to said priming means for priming said pump; a hose connected with another branch of said cross-fitting; a spray nozzle attached to said hose; and an anti-syphon valve connected with the remaining branch of said cross-fitting for preventing syphoning of said treating liquid from said tank through said hose when said hydraulic motor is inactive.

13. A liquid proportioning apparatus, comprising: a hydraulic motor including a plurality of cylinders, each containing a piston and requiring a predetermined volume of liquid to effect the movement of said piston through its working stroke, said hydraulic motor having a common exhaust outlet for operating liquid from all of said cylinders; a positive displacement pump for pumping a prescribed volume of a treating liquid, said pump being mounted upon one end of one of said cylinders of said hydraulic motor, said pump including a body having a pumping chamber, a pump piston in said pumping chamber arranged to be actuated in one direction by movement of the piston in the motor cylinder associated therewith, means for effecting a return of said pump piston, said body having an inlet passage and an outlet passage communicating with said pumping chamber, said inlet passage having an inlet check valve and being adapted to be connected with a supply of treating liquid, said outlet passage having an outlet check valve, said body also having a passageway interconnecting said outlet passage and said pumping chamber and providing a by-pass around said outlet check valve; and conduit means interconnecting said outlet passage of said pump and said exhaust outlet of said hydraulic motor so that a portion of the exhaust operating liquid can by-pass said outlet check valve and prime said pump when said motor is started, and, upon pumping operation of said pump, to effect admixture of the pumped treating liquid and said exhaust operating liquid.

14. A liquid proportioning and spraying apparatus, comprising: a hydraulic motor including a shaft, a plurality of cylinders arranged radially with respect to said shaft, a piston in each of said cylinders, a diaphragm at the outer end of each of said pistons, a cover member overlying all but one of said diaphragms and providing a pressure chamber for operating fluid outwardly of said diaphragms; a pump overlying said one diaphragm and including a cover portion providing a pressure chamber outwardly of said one diaphragm, an inlet adapted to be connected with a source of treating liquid, an outlet, and a piston adapted to be reciprocated by the piston in the cylinder associated with said one diaphragm; means for successively introducing water under pressure into said pressure chambers and for successively exhausting water from said pressure chambers, said hydraulic motor having a common outlet for receiving the exhaust-water from all of said pressure chambers; and conduit means connecting the outlet of said pump with said common exhaust outlet, so that said pumped treating liquid and said exhaust-water are mixed together in constant proportions.

15. A liquid proportioning and spraying apparatus, comprising: a hydraulic motor including a plurality of cylinders, each containing a piston and requiring a predetermined volume of fluid to effect movement of the piston through its working stroke, said hydraulic motor having a common exhaust outlet for operating fluid from all of said cylinders, a positive displacement pump for pumping a prescribed volume of a treating liquid, said pump having an inlet adapted to be connected with a supply of said treating liquid, and an outlet, said pump being mounted upon one of said cylinders of said hydraulic motor and arranged to be actuated by movement of the piston in the cylinder associated therewith; a three-way valve; a conduit connecting the outlet of said pump with an inlet of said three-way valve; a conduit connecting an outlet of said three-way valve with said exhaust outlet; a spray nozzle and a conduit connected with said exhaust outlet; and a high pressure nozzle and a conduit connected with an outlet of said three-way valve, said three-way valve being arranged to selectively deliver the pumped treating liquid discharged from said pump to either said high pressure nozzle for direct application, or to mingle with the exhaust operating liquid to be applied in predetermined, proportionately diluted form by said first-mentioned spray nozzle.

16. A pump comprising: a cover member adapted to be secured to one end of a cylinder of a prime mover; a pump body mounted upon said cover and having a pumping chamber, inlet and outlet passage means communicating with said pumping chamber, and a check valve in each of said passage means; a piston rod; a piston carried by one end of said rod and movable in said pumping chamber by a movable element of said prime mover; a transverse wall in said cover member arranged to form one end of said pumping chamber and to serve as a guide for said rod; an abutment carried by the opposite end of said rod on the side of said transverse wall remote from said piston; and means constantly urging said rod in one direction.

17. A pump as defined in claim 16, in which passage means is provided for by-passing liquid around the outlet check valve and into the pumping chamber to effect priming of said pump.

18. A pump comprising: a cover member adapted to be secured to one end of a cylinder of a hydraulic motor; a pump body having a pumping chamber, inlet and outlet passage means communicating with said pumping chamber, and a check valve in each of said passage means; a diaphragm disposed between said pump body and cover member; a piston rod having one end thereof extending through said diaphragm and into said pumping chamber; a piston carried by said one end of said rod; a transverse wall in said cover member arranged to form one end of said pumping chamber and to serve as a guide for said rod; an abutment plate carried by the opposite end of said rod on the side of said transverse wall remote from said diaphragm; a return spring between said abutment plate and said transverse wall constantly urging said rod in one direction; and a ring threadedly engaged with said cover member and arranged to limit the movement of said piston in said one direction, said ring being provided with a plurality of circumferentially spaced holes, and said cover member being provided with an elongated opening registering with said holes and affording access to said ring for adjustment thereof to vary the working stroke of said pump, without requiring disassembly of any parts of said pump.

19. A pump comprising: a cover member adapted to be secured to one end of a cylinder of a hydraulic motor; a pump body having a pumping chamber, inlet and outlet passage means communicating with said pumping chamber, and a check valve in each of said passage means; a diaphragm disposed between said pump body and cover member; a piston rod having one end thereof extending through said diaphragm and into said pumping chamber; a piston in said pumping chamber carried by said one end of said rod; a transverse wall in said cover member arranged to form one end of said pumping chamber and to serve as a guide for said rod; an abutment plate carried by the opposite end of said rod on the side of said transverse wall remote from said diaphragm; a return spring between said abutment plate and said transverse wall constantly urging said rod in one direction; and an adjustable means limiting the movement of said piston in said one direction to thereby limit the length of the working stroke of said piston.

DONALD G. GRISWOLD.

REFERENCES CITED

The following references are of record in the file of this patent:

UNITED STATES PATENTS

| Number | Name | Date |
| --- | --- | --- |
| 781,678 | Richwood | Feb. 7, 1905 |
| 1,023,583 | Morgan | Apr. 16, 1912 |
| 1,720,326 | Halstead | July 9, 1929 |
| 1,726,083 | McLaughlin | Aug. 27, 1929 |
| 2,009,890 | Jones | July 30, 1935 |
| 2,018,153 | Schulze | Oct. 22, 1935 |
| 2,128,263 | Ofeldt | Aug. 30, 1938 |

FOREIGN PATENTS

| Number | Country | Date |
| --- | --- | --- |
| 2,501 | Great Britain | of 1884 |